Figure 1:
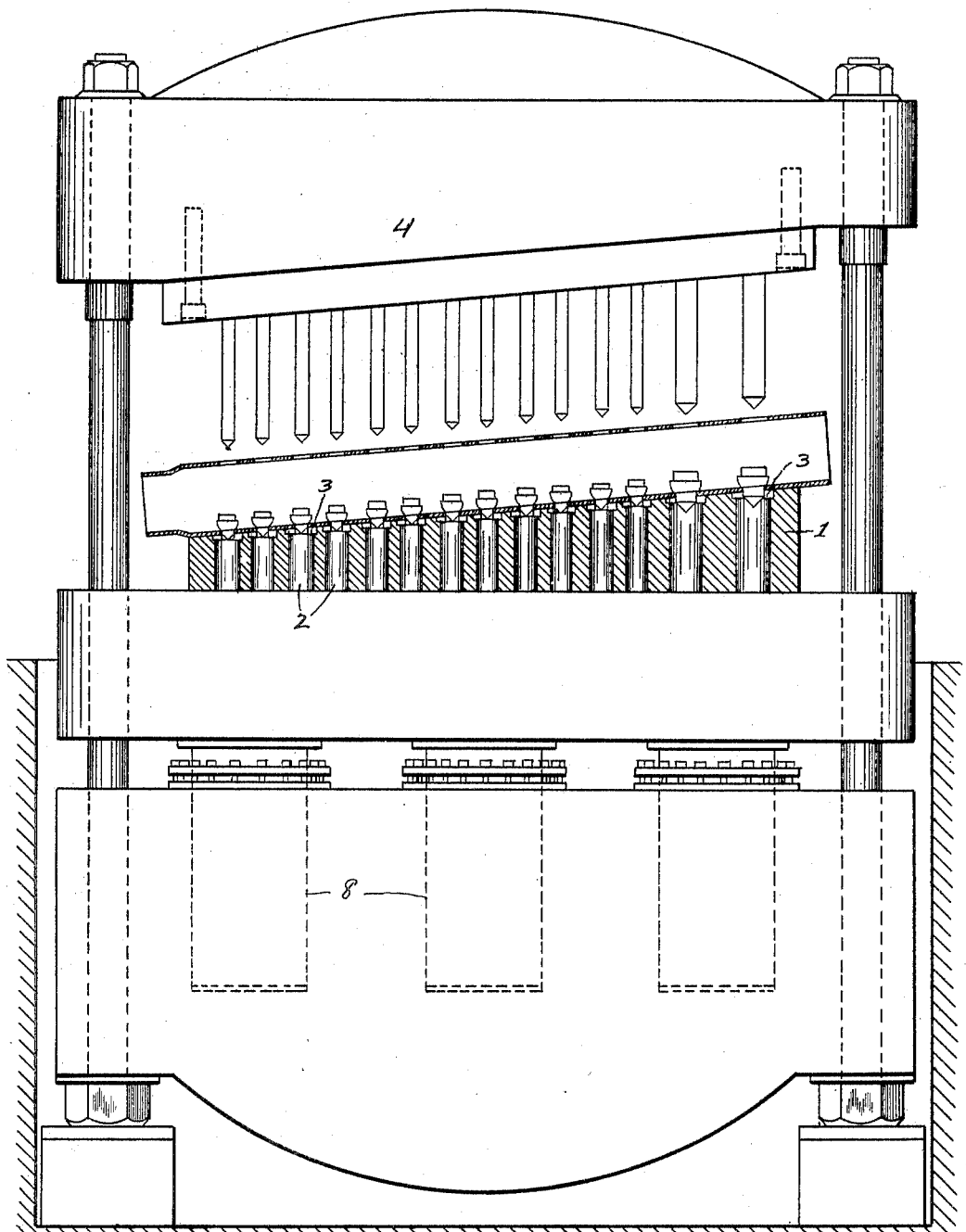

No. 759,482. PATENTED MAY 10, 1904.
J. P. SNEDDON.
FLANGING MACHINE.
APPLICATION FILED FEB. 14, 1903.
NO MODEL. 2 SHEETS—SHEET 2.
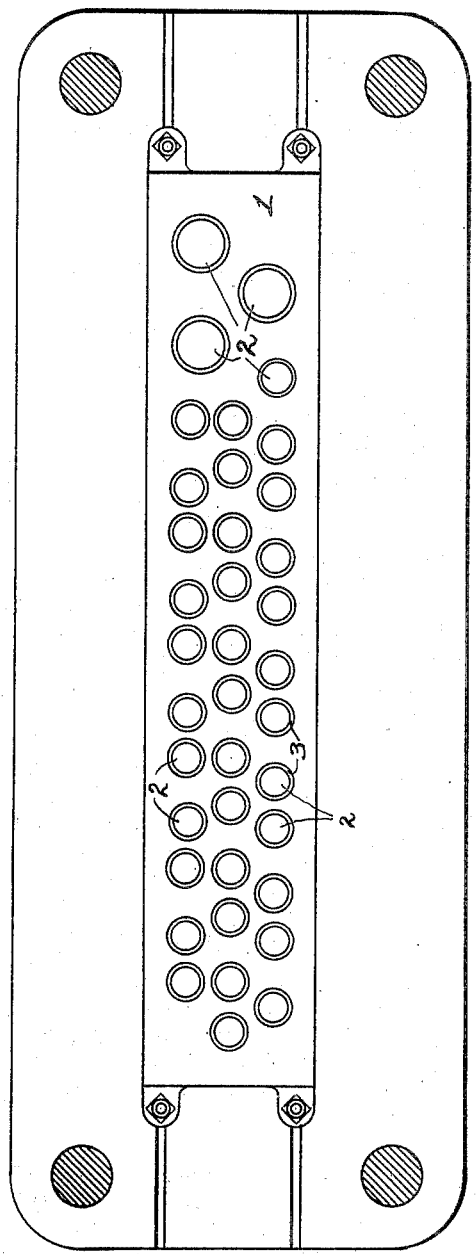
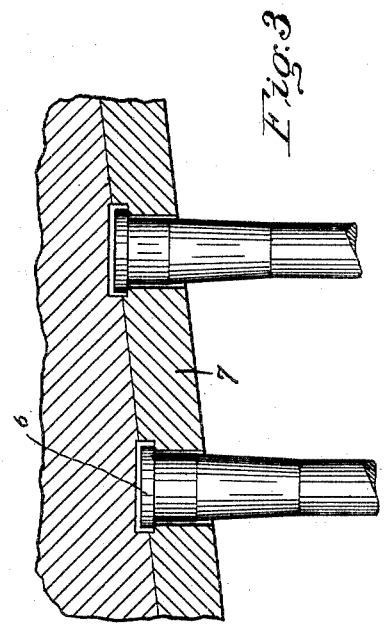
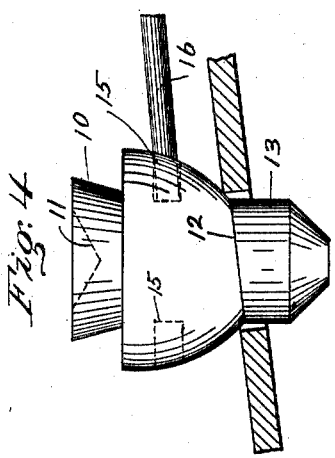

No. 759,482. Patented May 10, 1904.

UNITED STATES PATENT OFFICE.

JAMES P. SNEDDON, OF BARBERTON, OHIO, ASSIGNOR TO THE STIRLING COMPANY, OF CHICAGO, ILLINOIS, A CORPORATION OF NEW JERSEY.

FLANGING-MACHINE.

SPECIFICATION forming part of Letters Patent No. 759,482, dated May 10, 1904.

Application filed February 14, 1903. Serial No. 143,352. (No model.)

*To all whom it may concern:*

Be it known that I, JAMES P. SNEDDON, a resident of Barberton, in the county of Summit and State of Ohio, have invented a new and useful Improvement in Flanging-Machines; and I do hereby declare the following to be a full, clear, and exact description thereof.

My invention relates to apparatus for flanging the metal surrounding holes in the walls of wrought-metal boiler-headers or other tubular articles; and its object is to provide a gang or multiple press for simultaneously flanging a plurality of holes in headers and other articles and whereby the flanging tools or implements will always be directed exactly in the axial line of the holes to be flanged and irrespective of any shrinkage that may occur in the article being flanged.

A further object of my invention is to provide a flanging implement or tool especially adapted for forming flanges projecting at a slight angle from the perpendicular to the tube or other article being flanged.

In certain types of water-tube boilers the tubes are connected at either their front end or both at their front and rear ends to vertical members technically known as "headers" and which communicate at their upper ends with the steam and water drum. In marine boilers, where lightness is essential, these headers are formed of wrought metal. The tubes are inserted in holes through the rear walls of the headers, and corresponding holes are formed in the front walls to permit either of the cleaning of the tubes in some types of boilers or of their removal in other types of boilers, such as Niclausse boilers. The walls of the headers are formed of comparatively thin plate metal, so that it is necessary to form flanges around the holes in order to provide proper seats for the water-tubes or to provide a suitable seat for the handholds which close the openings in the front walls. These flanges ordinarily are turned outwardly and are formed by forcing a suitable tool or implement through the holes in the wall, while the header is supported upon a suitable bed or anvil having a recess therein, into which the flange is turned. As these headers sometimes are quite long and contain a large number of holes, the flanging of them becomes quite a serious problem, for if each tube-hole is flanged separately a large amount of time is required, thus necessitating frequent reheatings of the header in order to keep it at a good flanging heat. These frequent reheatings not only consume time and are costly, but also detrimentally affect the metal.

It has been proposed to flange all of the holes in one of the walls of the header simultaneously by using a gang or multiple flanging-press having as many flanging-plungers as there are holes to be flanged, so that by a single actuation of the press all of the holes in any one wall of the header are completed. With these gang or multiple presses the practice has been to hold the flanging plungers or pins rigid with reference to their carrying or supporting means. In practice it has been found that all of the flanging plungers or pins of such gang-presses are not at all times properly centered with reference to their respective holes, this being due to the unequal expansion and shrinkage of the heated header. The temperature of the headers obviously cannot always be the same, and, furthermore, they will cool more rapidly at one time than another and also more time may be consumed at one time than at another in getting the flanging implements into position for operation, so that it is never certain just what will be the temperature of the header at the moment of operating the press. This variation in temperature causes various degrees of shrinkage in the header, and as the latter is quite a long body this shrinkage will be considerable, so that if the flanging plungers or pins have been set with reference to a certain space between the two end holes it may be found that the header has shrunk to such an extent that if the pin or plunger at one end is properly centered with reference to its hole the corresponding pin at the opposite end of the header will be a considerable distance out of the center of its hole and the various pins in between the two end ones will correspondingly vary from the centers of their respective holes. This may result in forcing the flanging implements or bodies eccentrically through the holes and producing irregularities in the headers.

The principal object of my invention is to provide a flanging-press so constructed that the foregoing difficulties are overcome and wherein all of the flanging plungers or pins will be accurately centered with reference to their respective holes and irrespective of any variation in the heat or shrinkage of the header.

In most water-tube boilers the tubes are inclined from the horizontal and the headers generally are placed approximately in a perpendicular position, so that the flanges forming the seats for the tube must be inclined from the perpendicular to the axis of the header.

A further object of my invention is to provide a flanging implement or projectile and a press for using the same, whereby the flanges can be formed at the necessary incline from the perpendicular with ease and accuracy.

In the accompanying drawings, Figure 1 is a side elevation, partly in section, showing my improved flanging-press. Fig. 2 is a plan view of the anvil or supporting-die. Fig. 3 is an enlarged sectional view showing the manner of connecting the pins or plungers to their carrier or support, and Fig. 4 is a side view of one of the flanging implements or projectiles used.

In the drawings, 1 represents the anvil or supporting-die, upon which the header is placed. This anvil is provided with a series of holes or recesses 2 in the face thereof, said recesses in number, dimensions, and relative spacing corresponding to the number, diameter, and relative positions of the water-tubes required in the particular form of boiler for which the header is designed. As shown in Fig. 2, there are three rows of small holes for most of the length of the header and two rows of larger holes for the remainder of the distance, these several holes being placed in such position that the tubes inserted therein will have the required staggered relation. The number, size, and relative location of these holes will differ with different headers, and the anvil or supporting-die 1 must be provided with corresponding holes or recesses. Around the upper ends of these holes are annular cavities 3, which form, in effect, die-cavities into which the flanges are turned and by which they are shaped to some extent.

Above the anvil or die 1 is a suitable support or cross-head 4, carrying a series of plungers or pins 5, corresponding in number, dimension, and relative spacing to the holes in the anvil. These plungers or pins are mounted on the support or cross-head in such a manner that they have a movement laterally in all directions. This can be secured by various means—such, for instance, as having a ball-and-socket connection; but as the lateral movement need be only very slight I prefer to provide the pins at their upper ends with heads 6 and secure them in place by means of a face-plate 7, suitably secured to the cross-head or other support. The openings through the securing-plate 7 and the cavities in the cross-head in which the heads 6 lie are of sufficient size, as shown in Fig. 3, to permit the pins to swing slightly in all directions. Consequently the pins can adjust themselves so that they will force the flanging implement or body centrally through their respective holes and irrespective of any variation of shrinkage that may occur in the header. Either the support 4 or the anvil 1 will be reciprocated, and this reciprocation may be secured by any convenient mechanism, but preferably by a standard hydraulic press. In the drawings the anvil 1 is shown as the movable member, being actuated by the power-cylinders 8.

The flanging implements or "projectiles," as I term them, must be independent of the plungers or pins 5 in order that they can be inserted in the header or other tubular article and forced through the lower wall thereof. Various forms of such implements or projectiles may be used, such as a sphere or semisphere, as shown in my patent granted February 11, 1902, No. 693,177, or a section of an ellipse, section of cone, or any other preferred shape. A preferred form of such projectile is shown in Fig. 4, the same having a body portion 10, which is a modified truncated cone, and having on its top face a countersunk conical or concave depression 11. The lower ends of the plungers or pins 5 are conical or convex, so that in the operation of the press when the pins approach the projectiles their conical ends will slide down into the countersunk recesses 11 of the projectiles and center themselves therein, the pins swinging in their bearings to permit this. As a consequence they will force the projectiles perpendicularly and centrally through the holes in the wall of the header and throw out a flange uniformly all around said hole and irrespective of variations in shrinkage of the header. In order to give these flanges a proper inclination to the perpendicular, the upper face of the anvil or die 1 is inclined, the particular inclination shown in the drawings being an angle of one to ten to the horizontal; but this, of course, will vary with different headers. As a consequence when the projectiles are forced through the holes in a perpendicular direction the flanges will be given the proper inclination. The pins or plungers 5 preferably will all be of the same length, and the lower face of the support or cross-head 4 is inclined in the same direction and to the same degree as the anvil 1; but the same result could be secured by making the lower face of the cross-head horizontal and having pins of varying lengths. The flanging implements or projectiles 10 likewise are preferably shaped to correspond to the angle to be given to the flanges, and, as shown in Fig. 4, said projectiles are so shaped that their lower or supporting face 12 is at an angle of one to ten to their vertical axis. Consequently when pressure is applied to their upper faces they will be forced in a perpendicular direction through the header when supported on the inclined anvil or die 1. Preferably, also, these projectiles will be provided on their lower faces with the teat or projection 13, adapted to fit in the hole over which the projectile is placed, in order to properly position the same and to initially guide the projectile in its downward movement. The projectiles are provided in their sides with holes, such as shown at 15, into which can be inserted the end of a rod, such as 16, by means of which the projectiles can be conveniently inserted in the header and placed over their respective holes.

The flanging implement is not claimed in this application, but is claimed in my application, Serial No. 176,039, filed October 7, 1903, and being a division of this application.

While I have shown and described my invention particularly as adapted for flanging holes in wrought-metal headers, it is to be understood that it is not limited thereto, but that it is equally as well adapted for flanging holes in any other tubular article and also that certain features thereof are applicable for flanging holes in articles which are not tubular—such, for instance, as flat metal plates. It is obvious that the loose connection of the pins or plungers with their support will be equally advantageous when flanging a hot flat plate as when flanging a hot tubular article, as the shrinkage of the plate is liable to cause exactly the same variation as the shrinkage of the hot header. For flanging plates, however, the flanging tool or implement need not necessarily be entirely separate from the plungers, but could be formed integral therewith, but preferably as a separate piece hinged thereto, so that when the plunger assumes a position slightly out of the perpendicular the flanging head or implement itself can pass through the plate in a true perpendicular direction. Furthermore, the particular form of flanging projectiles shown is of value in flanging a flat plate or any other article when supported in an inclined position equally as well as for flanging the tubular header shown when supported in a similar position.

What I claim as my invention, and desire to secure by Letters Patent, is—

1. In apparatus for flanging holes in wrought-metal articles, the combination of an anvil or supporting-die having a series of recesses therein, a series of flanging plungers or pins, a support to which said pins are loosely connected, said pins being free from supports or guides at all other points of their length so as to be capable of swinging freely in all directions, and means for causing said support and the anvil to approach each other.

2. In apparatus for flanging holes in wrought-metal tubular articles, the combination of an anvil or supporting-die having a series of recesses therein, a series of plungers or pins, a support to which said plungers or pins are loosely connected, said plungers or pins being free from supports or guides at all other points of their length, means for causing said anvil and support to approach each other, and a number of separate implements or projectiles adapted to be placed in the tube and forced by the plungers through holes in the wall of said tubular article.

3. In apparatus for flanging holes in wrought-metal tubular articles, the combination of an anvil or supporting-die having a series of recesses therein, a series of plungers or pins, a support to which the same are loosely connected, said plungers or pins being free from supports or guides at all other points of their length, means for causing said support and anvil to approach each other, a series of implements or projectiles corresponding in number to the plungers and adapted to be forced by the plungers through the holes in the tubular article, and coacting faces on the ends of the plungers and upper ends of the projectiles adapted to center the plungers with reference to said projectiles.

4. In apparatus for flanging holes in wrought-metal tubular articles, the combination of a die or support having a series of recesses therein, a series of plungers or pins, a support to which said plungers are loosely connected, a corresponding number of separate implements or projectiles adapted to be forced by the plungers through the holes in the wall of said tubular article, said plungers having reduced centering ends and said implements or projectiles having centering depressions in their upper faces, whereby the plungers are centered with reference to the implements.

5. In apparatus for flanging wrought-metal tubular articles, the combination of an anvil or supporting-die having a recess therein, an implement or projectile adapted to be inserted in the tube and placed over the hole in one of the walls thereof, said projectile having a centering depression in its upper face, and a plunger provided with a reduced centering end adapted to center itself in the depression in the projectile and force the same through the hole over which it is placed.

6. In apparatus for flanging wrought-metal tubular articles, the combination of an anvil or supporting-die having a recess therein, an implement or projectile adapted to be inserted in the tube and placed over a hole in one of the walls thereof, said projectile having a centering depression in its upper face, a plunger provided with a reduced centering end adapted to seat itself in the conical depression in the upper face of the projectile and force the same through the hole over which it is placed, and a support or carrier to which said plunger is loosely connected.

7. In apparatus for flanging wrought-metal tubular articles, the combination of an anvil or supporting-die having an inclined supporting-face with a series of recesses therein, a series of implements or projectiles adapted to be inserted in the tube and placed over holes in the walls thereof, said projectiles having non-spherical lower faces inclined to their perpendicular axes, and a series of plungers arranged to engage said projectiles and force them through the holes over which they are placed.

8. In apparatus for flanging wrought-metal tubular articles, the combination of an anvil or supporting-die having an inclined supporting-face with a series of recesses therein, a series of projectiles or implements adapted to be inserted in the tube and placed over holes in one of the walls thereof, said projectiles having non-spherical lower faces inclined to their perpendicular axes, a series of plungers arranged to engage said projectiles and force them through the holes over which they are placed, said plungers and projectiles having coacting faces adapted to center the plungers with reference to the projectiles, and a support to which said plungers are loosely connected.

9. In apparatus for flanging wrought-metal tubular articles, the combination of an anvil or supporting-die having a series of recesses therein and provided with an inclined supporting-face, a series of implements or projectiles adapted to be inserted into the tubular body and placed over holes in one of the walls thereof, said implements having their lower faces inclined with reference to their perpendicular axes, a series of plungers, a cross-head or support to which said plungers are loosely connected, and coacting faces on the plungers and projectiles adapted to center the plungers with reference to the projectiles.

In testimony whereof I, the said JAMES P. SNEDDON, have hereunto set my hand.

JAMES P. SNEDDON.

Witnesses:
E. E. BAKER,
J. C. FRANK.